Oct. 15, 1957 W. C. WOOTTON 2,809,413
FASTENING DEVICE
Filed April 13, 1953
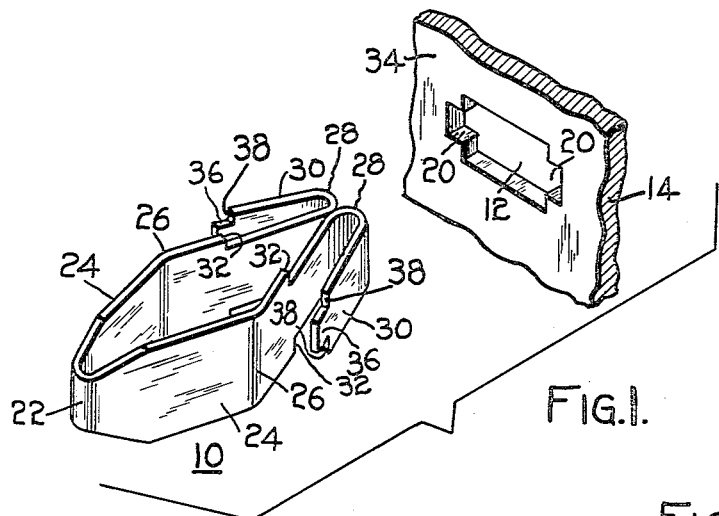
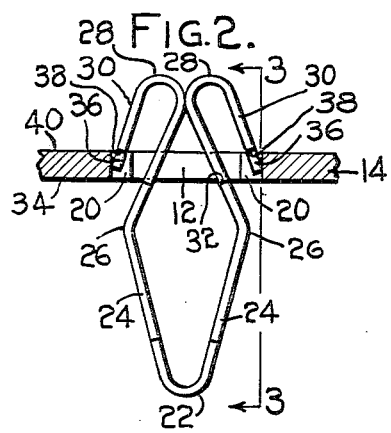
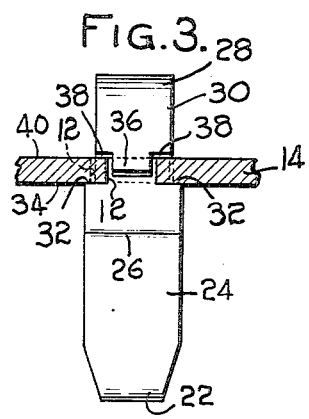
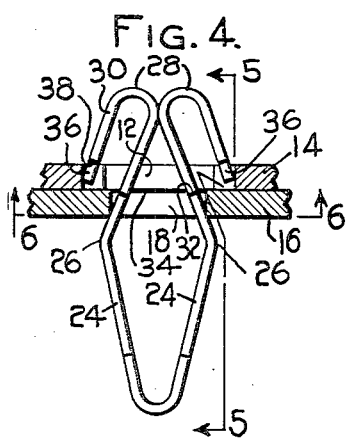
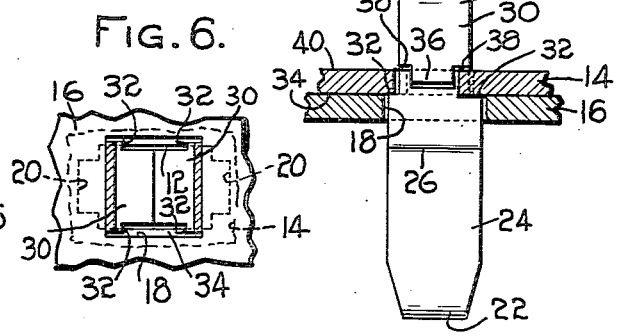
INVENTOR:
WILLIAM C. WOOTTON,
BY Robert E Ross
ATTORNEY.

United States Patent Office 2,809,413
Patented Oct. 15, 1957

2,809,413

FASTENING DEVICE

William C. Wootton, Centerville, Calif., assignor, by mesne assignments, to United-Carr Fastener Corporation, Boston, Mass., a corporation of Delaware Application April 13, 1953, Serial No. 348,521

1 Claim. (Cl. 24—213)

This invention relates generally to fastening devices, and has particular reference to a fastener for assembly into a panel opening.

The object of the invention is to provide a fastening device which is adapted for snapping engagement into a panel opening and to be retained therein to receive another panel in snapping engagement.

A further object of the invention is to provide a fastening device formed of a single strip of flat sheet metal having end portions shaped to enter a panel opening in snapping engagement and to resist axial forces in either direction after assembly.

Other objects of the invention will, in part, be obvious and will, in part, appear hereinafter.

In the drawing:

Fig. 1 is a perspective view of a fastener embodying the features of the invention and a panel having an opening for receiving the fastener in snapping engagement;

Fig. 2 is a view in section of the fastener and panel of Fig. 1 in the assembled position;

Fig. 3 is a view in section taken on line 3—3 of Fig. 2;

Fig. 4 is a view in section similar to Fig. 2 with a second panel assembled onto the fastener in snapping engagement;

Fig. 5 is a view in section taken on line 5—5 of Fig. 4; and

Fig. 6 is a view in section taken on line 6—6 of Fig. 4.

Referring to the drawing, there is illustrated a fastening device 10 which is adapted for assembly into an opening 12 in a support panel 14 so as to be retained therein to receive a second panel 16 having an opening 18 in snapping engagement.

In the preferred embodiment, the opening 12 in the panel 14 is substantially rectangular in shape, and has extensions 20 at the ends for a purpose to appear hereinafter.

The fastener 10 is preferably formed of a generally U-shaped strip of flat sheet metal, and has a transverse medial bend 22, forming a pair of legs 24 which extend in the same general direction. The legs 24 are inclined slightly away from each other from the bend 22, and then are inclined slightly toward each other, forming transverse shoulders 26. The legs 24 are each provided with U-shaped extensions 28 which continue from the legs toward each other, and then turn back on themselves to terminate in free ends 30 disposed in spaced relation to the legs. The legs 24 have a width which is greater than the width of the opening 12 in the panel 14, and the U-shaped extensions 28 have a width less than the width of the legs, and slightly less than the width of the opening 12 to enable the extensions to enter the opening as will appear hereinafter. The junction between the extensions 28 and the legs 24 forms a first set of lateral extending shoulders 32 for bearing against one side 34 of the panel 14 when the fastener is assembled into the opening therein. The free ends 30 are provided with tongues 36 which extend therefrom, and have a width less than the width of the free ends, and slightly less than the width of the extensions 20 at opposite ends of the opening 12 for a purpose to appear hereinafter. The junction between the tongues 36 and the free ends 30 forms a second set of lateral shoulders 38, which face in a direction generally opposite to the first set of lateral shoulders 32, for bearing against the other side 40 of the panel at opposite sides of the extended portions.

The fastener is easily assembled into the opening 12 in the panel 14 by merely forcing the U-shaped extensions 28 into the opening so that they are flexed together to pass therethrough and then snap outwardly so that the tongues 36 are disposed in the extended portions 20 of the opening; the first set of shoulders 32 bear against the front side 34 of the panel on opposite sides of the opening, and the second set of shoulders bear against the rear face 40 of the panel on opposite sides of the extended portions. (See Fig. 3.)

After such assembly, the shoulders in engagement with opposite sides of the panel prevent axial movement of the fastener in the opening, so that the second panel 16 may be assembled therewith. The opening 18 in the second panel has at least one dimension less than the distance between the transverse shoulders 26 on the fastener, so that as the fastener enters the opening 18, the legs 24 flex together to allow the panel to pass the shoulders and then spring outwardly to retain the two panels in assembly. (See Fig. 4.)

It will be noted that the first set of shoulders and the second of shoulders are spaced a short distance longitudinally in relation to the axis of the fastener. This distance will, of course, depend in part on the thickness of the panel 12 into which the fastener is to be assembled; however, in most cases the shoulders will be closer together than the corresponding thickness of the panel, so that the free ends 30 are in a flexed condition after assembly.

Since certain obvious changes may be made in the device without departing from the scope of the invention, it is intended that all matter contained herein be interpreted in an illustrative and not in a limiting sense.

I claim:

A fastening device for snapping engagement into a panel opening, comprising a flat strip formed of a single piece of resilient sheet metal having a transverse medial bend forming legs extending in the same general direction, said legs being inclined slightly away from each other from the bend and then being inclined toward each other forming bowed portions to abut an apertured part, said legs having extensions continuing toward each other and then being each bent outwardly and back on themselves to terminate in free ends, said extensions having a width less than the width of the legs thereby forming a first set of lateral shoulders in the side edges of the strip at the jointure point of the extensions with the legs for bearing against one side of the panel, the free ends of said extensions having tabs extending in the same direction therefrom and having a width less than the width of the extensions thereby forming a second set of lateral shoulders in the side edges of the strip facing in a direction generally opposite to the direction of the first set of shoulders for bearing against the opposite side of the panel.

References Cited in the file of this patent

UNITED STATES PATENTS

| 1,976,889 | Place | Oct 16, 1934 |
| 2,077,120 | Lombard | Apr 13, 1937 |
| 2,093,038 | Douglas | Sept 14, 1937 |
| 2,156,670 | Van Uum | May 2, 1939 |
| 2,175,814 | Pender | Oct. 10, 1939 |
| 2,187,303 | De Vito | Jan. 16, 1940 |
| 2,194,847 | Churchill | Mar. 26, 1940 |
| 2,243,322 | Van Uum | May 27, 1941 |